United States Patent [19]

Clayton

[11] 4,237,955
[45] Dec. 9, 1980

[54] APPARATUS AND METHOD FOR GROOVING TIRES

[75] Inventor: Andrew R. Clayton, Salisbury, N.C.

[73] Assignee: Brad Ragan, Inc., Spruce Pine, N.C.

[21] Appl. No.: 6,517

[22] Filed: Jan. 25, 1979

[51] Int. Cl.³ .......................................... B29H 21/08
[52] U.S. Cl. .................................................... 157/13
[58] Field of Search ........................... 157/13; 156/96

[56] References Cited

U.S. PATENT DOCUMENTS

| | | | |
|---|---|---|---|
| 4,080,230 | 3/1978 | Batchelor et al. | 157/13 X |
| 4,081,017 | 3/1978 | Appleby et al. | 157/13 |
| 4,147,196 | 4/1979 | Jarry | 157/13 |

*Primary Examiner*—James G. Smith

*Attorney, Agent, or Firm*—Bell, Seltzer, Park & Gibson

[57] ABSTRACT

An apparatus and method for grooving tires which is particularly useful for renewing previously used off-the-road tires and which removes a portion of a layer of rubber applied to a tread face of a carcass so as to form on the tread face a pattern of lugs. Relative motion between a heated knife and a tire carcass is controlled and coordinated in such a manner as to form a particular selected tread pattern, while controlling the number and spacing of the lugs and the curvature, angularity, and depth of the incisions which form the lugs. As described more fully hereinafter, a digital, electronic central processor unit controls the operation of components of the apparatus and may be programed to follow particular functional sequences.

44 Claims, 20 Drawing Figures

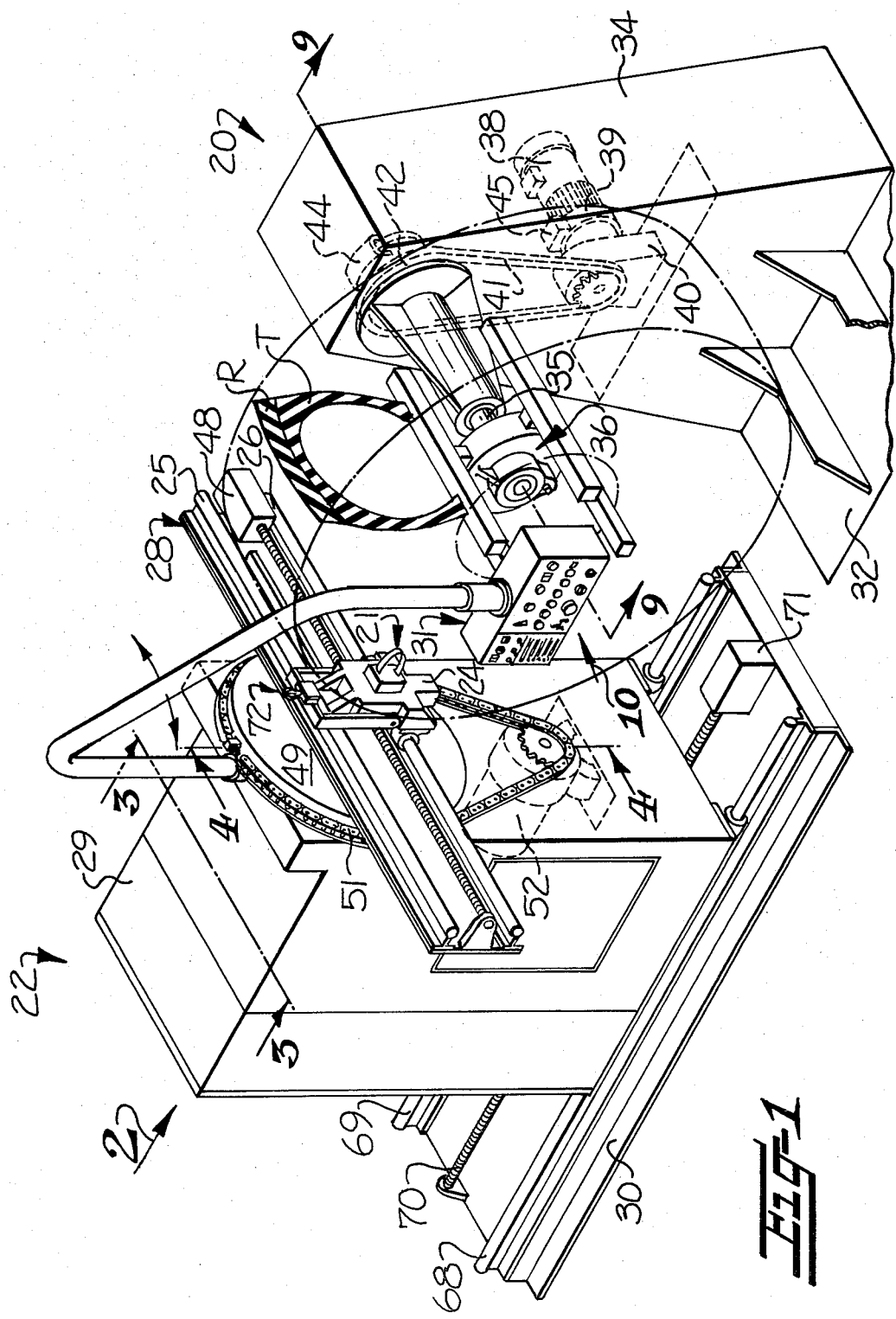

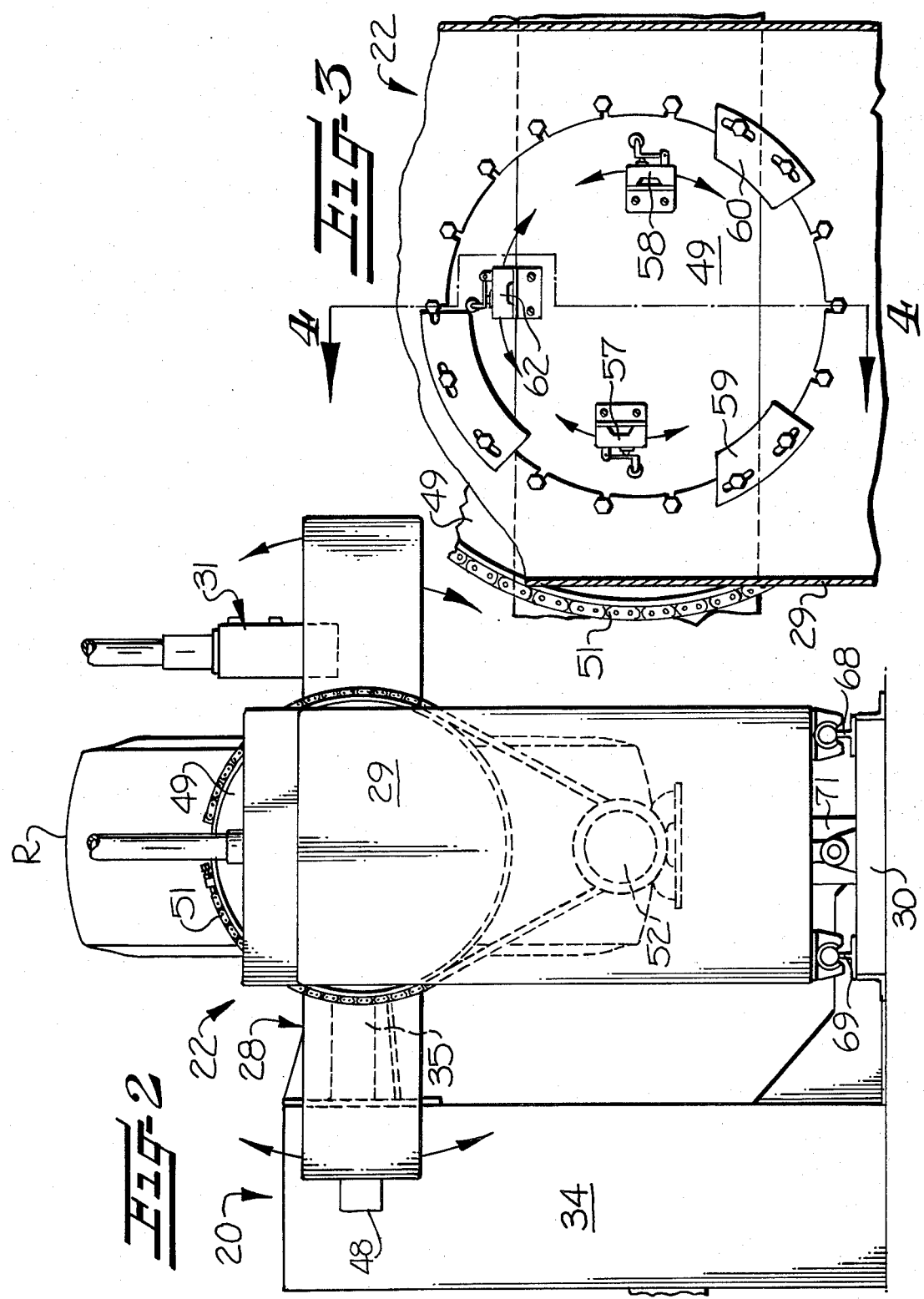

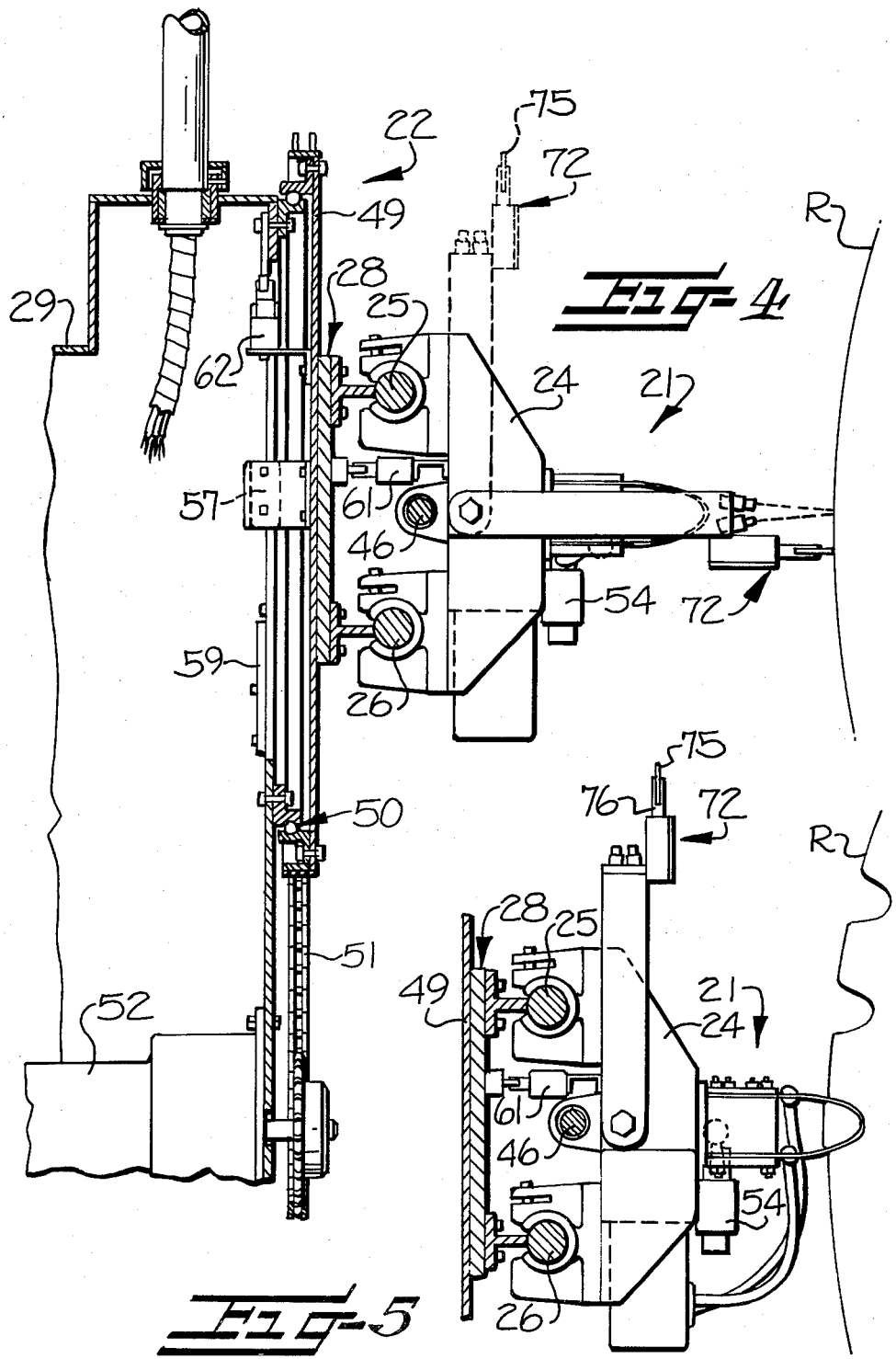

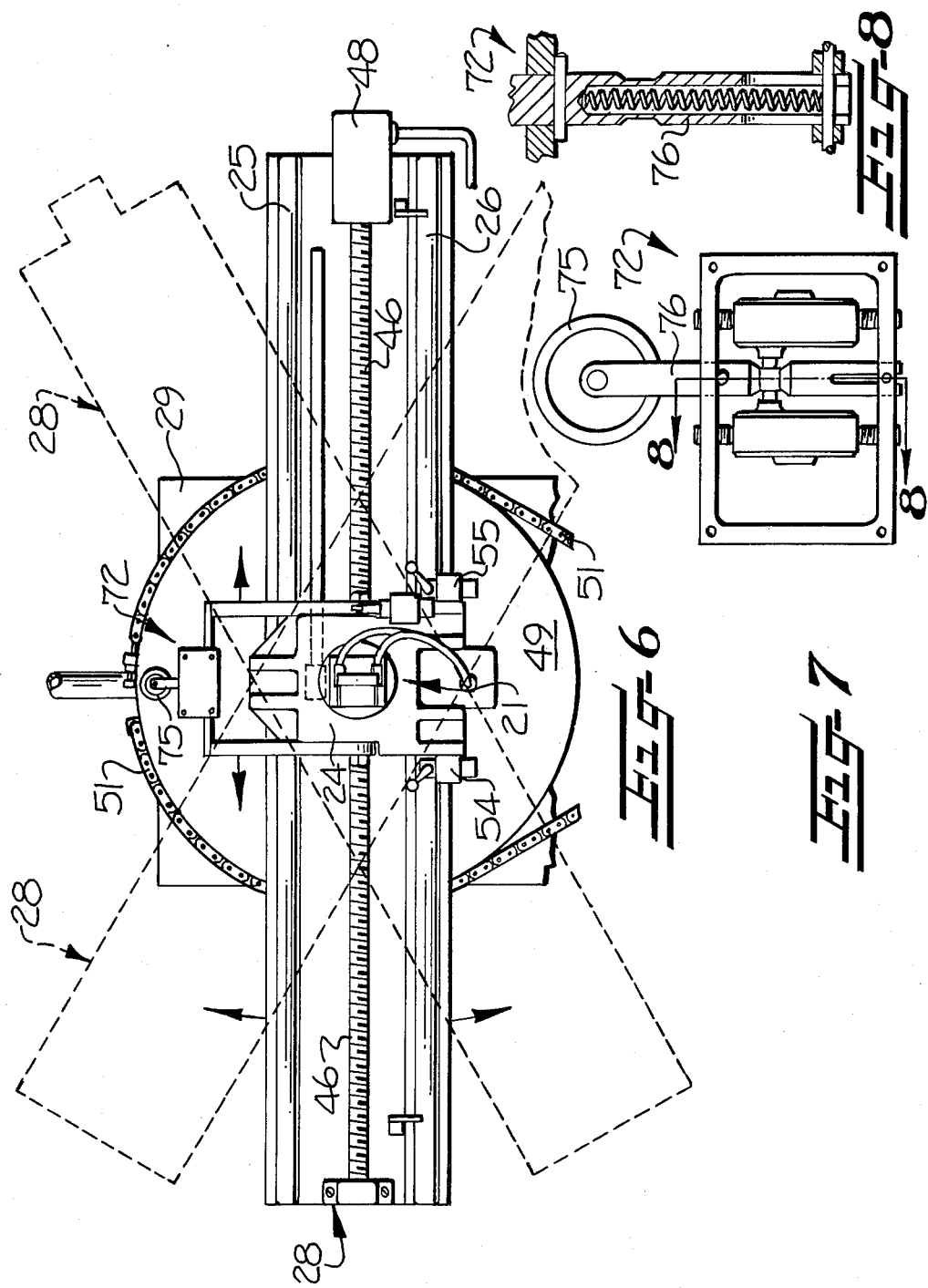

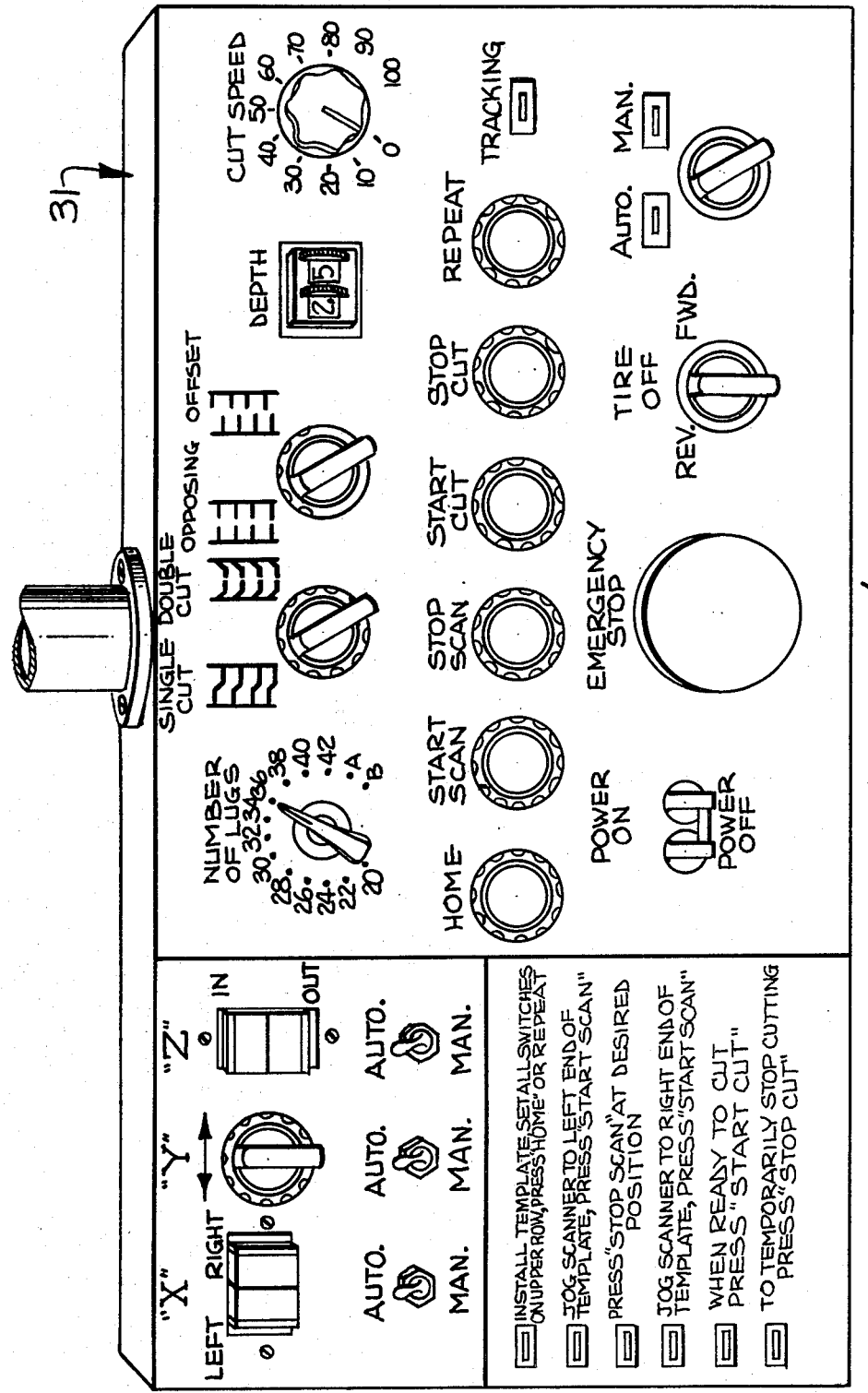

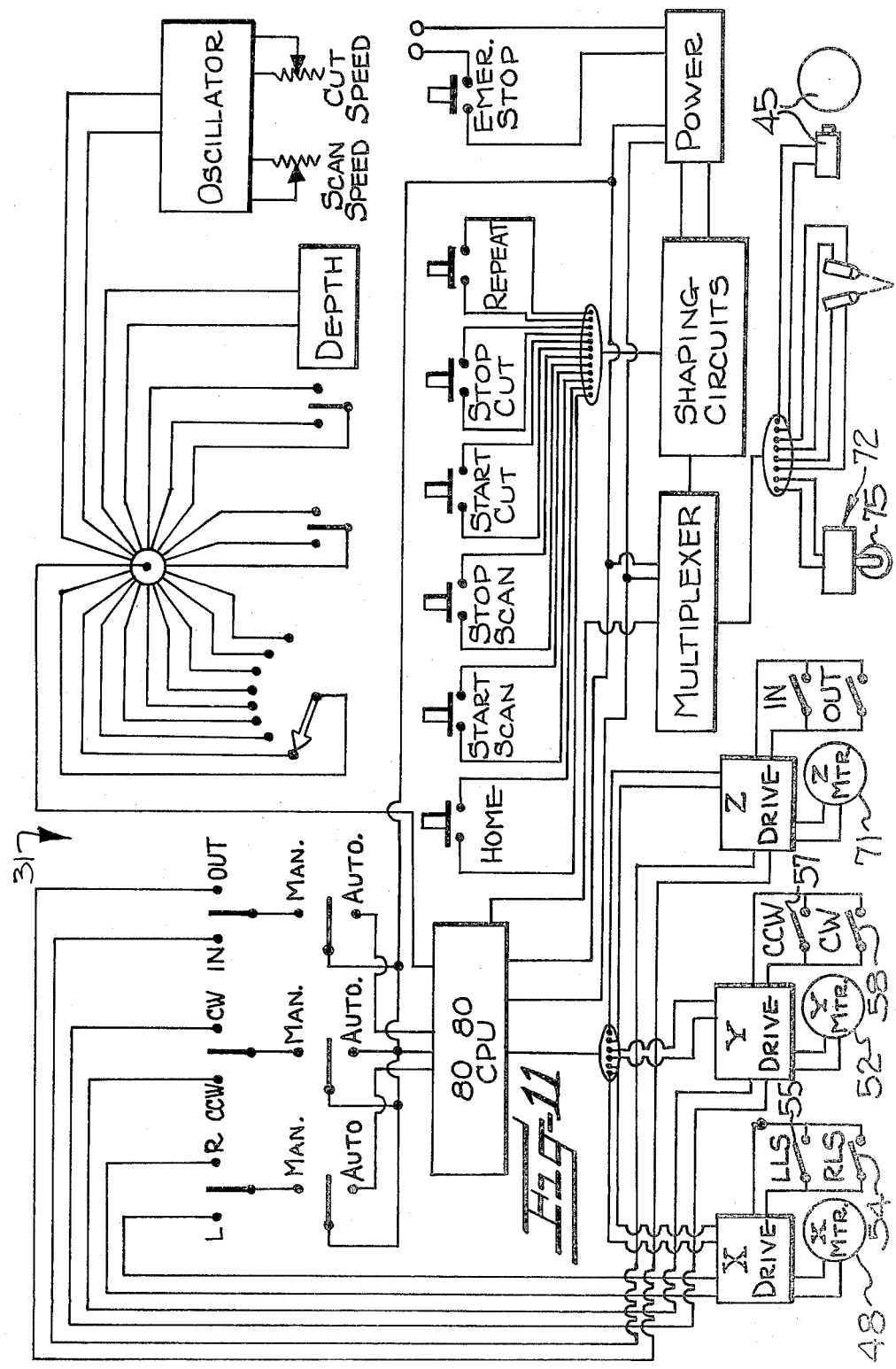

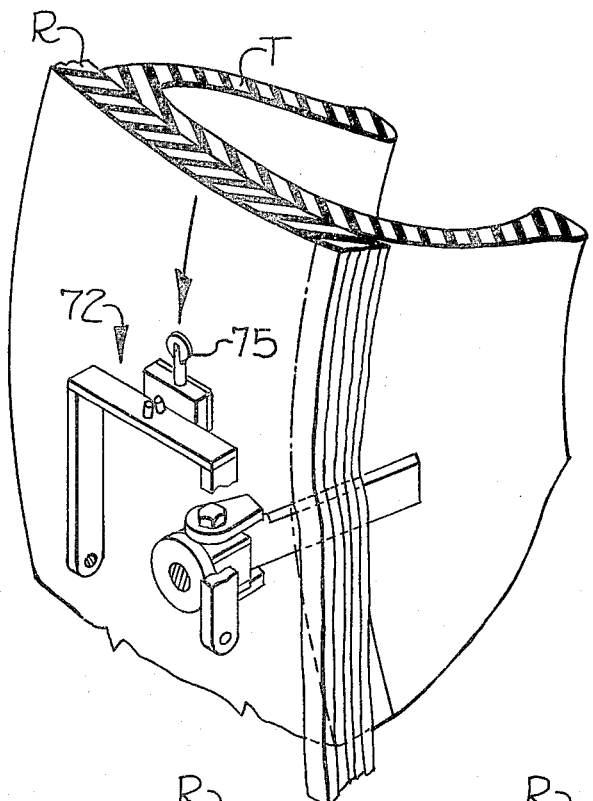
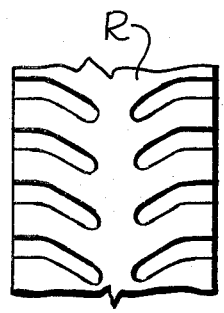
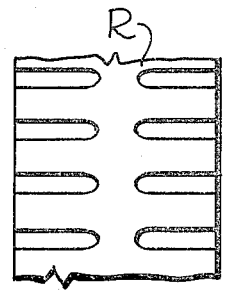
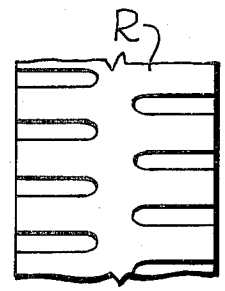
Fig-13  Fig-14  Fig-15
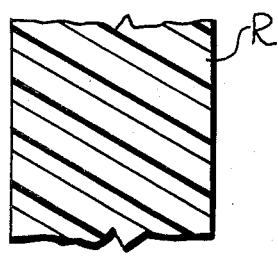
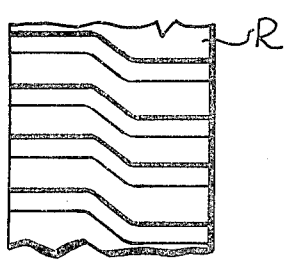
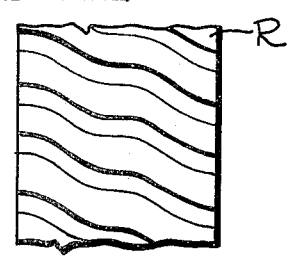
Fig-16  Fig-17  Fig-18

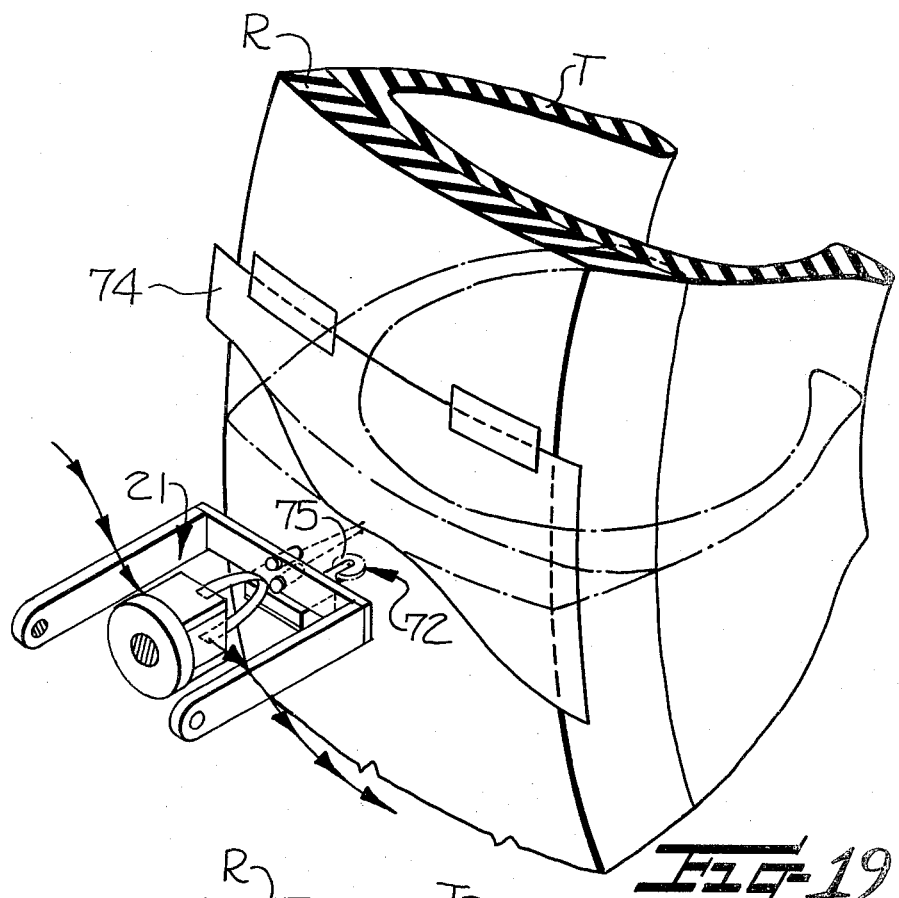
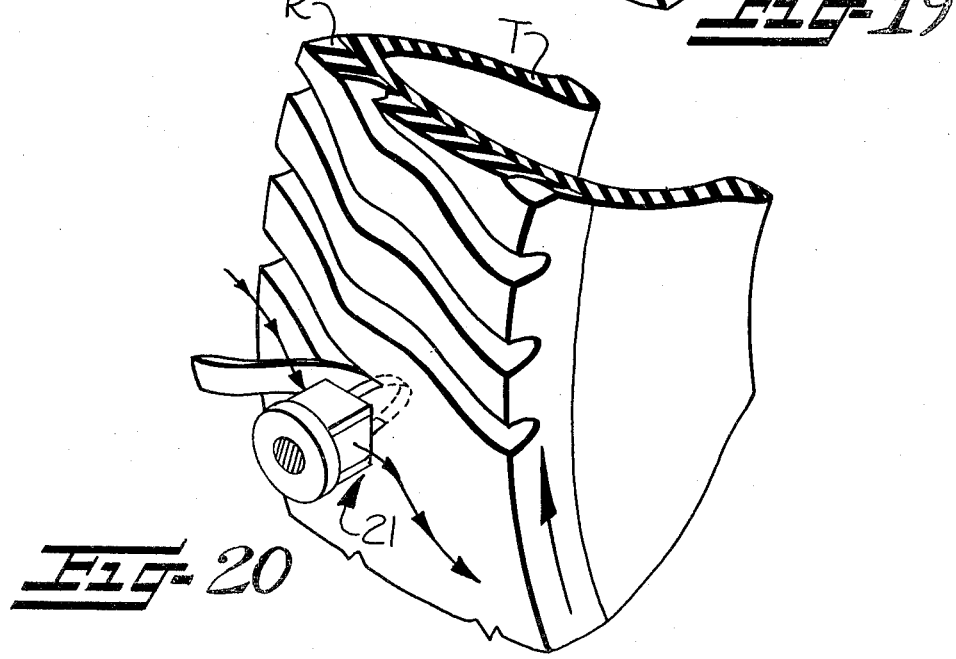

APPARATUS AND METHOD FOR GROOVING TIRES

FIELD AND BACKGROUND OF THE INVENTION

The retreading, renewing or rebuilding of large, off-the-road, heavy duty tires has departed in recent years from the classic prior procedure referred to as mold curing. Mold curing, as known to persons in the tire industry, included steps of applying uncured rubber to a tire carcass and then inserting the carcass into a configured mold. The tire carcass and uncured rubber were subjected to elevated pressures and temperatures to shape the uncured rubber into a desired tread configuration, cure the previously uncured rubber, and adhere the new tread material to the tire carcass.

Techniques which have replaced mold curing for large, off-the-road, heavy duty tires are exemplified by Ragan U.S. Pat. No. 27,006 and Ragan U.S. Pat. No. 3,472,714. The first mentioned patent, Ragen U.S. Pat. No. 27,006, describes a method in which discrete lugs are formed and are then applied to the tread face of a tire undergoing renewing or rebuilding. The second, Ragan U.S. Pat. No. 3,472,714, describes a method in which a body of rubber is applied to the tread face of a tire undergoing renewing or rebuilding and portions of the rubber are then removed with a heated knife to form lugs of the remainder.

Of the two processes briefly described, the first to achieve commercial significance, and to substantially replace classic mold curing, was the discrete lug process described for example in Ragan U.S. Pat. No. 27,006. Such processes were found to be significant improvements over prior practices, particularly in the area of reduced carcass damage during the renewing or rebuilding process and consequent extended carcass life.

Discrete lug processes, such as those of Ragan U.S. Pat. No. 27,006, suffer from a relatively high labor requirement. That is, the number of man-hours required to be spent in the renewing or rebuilding of a particular size tire carcass is greater than the man-hours required by classic mold curing. For some time, the higher labor cost involved was acceptable due to the substantially better result achieved. More recently, the cost of the higher labor requirement has become more burdensome, and development has turned toward processes such as the cut tread process described in Ragan U.S. Pat. No. 3,472,714.

As will be noted from the disclosure of that prior Ragan patent and other patents known to persons skilled in the applicable art, the apparatus used for cutting tread configurations was relatively simple and almost crude during the early stages of development of such processes. More particularly, the heated knives used were operated manually and were either guided manually or guided by relatively simple and unsophisticated mechanical mounting arrangements. While such approaches to cut or groove tread processes were able to clearly demonstrate the commercial viability of such a process, and show the promise of reducing the labor requirement for renewing or rebuilding tires of the type described, the manual or semi-manual apparatus available and employed imposed certain restrictions on the processes. More recently, development has turned toward grooving or cutting apparatus and methods having greater flexibility and adaptability, as shown for example in Appleby et al U.S. Pat. No. 4,081,017. While such attempted mechanization or automation of such cutting processes has improved upon the relatively unsophisticated and crude apparatus used in the earliest stages of development of cut tread processes, proper operation of such an apparatus still requires a substantial level of skill from an operator. Further, such an apparatus is mechanically complex, and does not assure that particular tread configurations are repeatedly and consistently achieved. Finally, such arrangements are relatively inflexible and are not readily adapted to variations in tire carcass dimensions or in patterns of tread design. These difficulties and deficiencies result in less than optimal realization of the benefits available, such as by resulting in excessively thick or excessively thin undertread layers of newly applied rubber in a renewed or rebuilt tire. Where an undertread portion is too thick, excessive rubber is used and overheating failure may occur. Where too thin, failure occurs due to separation, tearing or puncturing. Sometimes, inaccurate control destroys a tire carcass by cutting into the plies of the main carcass body.

SUMMARY OF INVENTION

With the above discussion in mind, it is an object of this invention to provide an apparatus and method for grooving tires which is an improvement over the apparatus and methods currently in use in the renewing or rebuilding of off-the-road heavy duty tires and which avoids and overcomes the deficiencies and difficulties mentioned above. In realizing this object of the present invention, an arrangement is provided for mounting a tire of the type described to which rubber has been applied adjacent a heated knife capable of incising or cutting grooves in the rubber applied to the tire carcass. By means of appropriate controls, as described more fully hereinafter, relative movement between the tire carcass and the knife is controlled and coordinated so as to form in the rubber applied to the tread face of the tire carcass a desired lugged configuration tread. More particularly, the mounting arrangements for the knife and tire carcass are provided with drives capable of moving the tire carcass and knife one relative to the other through three coordinates. Such a control accomplishes the grooving of the tire carcass in any desired or appropriate pattern.

Another object of the present invention is to facilitate a reduction in the labor required for renewing or rebuilding a large, off-the-road, heavy duty tire in accordance with a cut tread process. In realizing this object of the present invention, control over the relative movement of a hot knife and a tire carcass is accomplished through the use of a digital electronic central processing unit or microprocessor. Through the use of such a logic system, the skill required of an operator is reduced, while improved accuracy, tread speed and flexibility of formation are achieved.

Yet a further object of the present invention is to simplify the mechanical arrangements necessary and appropriate to an apparatus for a cut tread process of renewing or rebuilding large, off-the-road, heavy duty tires. In realizing this object of the present invention, a microprocessor control over relative movement of a hot knife and tire carcass includes a programming step by which a relatively simple guiding templet is employed to program or "teach" the control system to produce a desired tread configuration without necessity of complex mechanical interconnections or mechanical guides.

BRIEF DESCRIPTION OF DRAWINGS

Some of the objects of the invention having been stated, other objects will appear as the description proceeds, when taken in conjunction with the accompanying drawings, in which FIG. 1 is a perspective view of an apparatus embodying the present invention;

FIG. 2 is an elevation view, taken generally as indicated by an arrow in FIG. 1, of portions of the apparatus of FIG. 1;

FIG. 3 is an enlarged elevation view, partially in section, similar to FIG. 2;

FIG. 4 is an elevation view, partially in section taken generally along the line 4—4 in FIGS. 1 and 3, showing portions of the apparatus of the present invention as operated in a programming or teaching mode;

FIG. 5 is a partial elevation view, partially in section, generally similar to FIG. 4 and showing certain components of the apparatus of the present invention as operating in a grooving or cutting mode;

FIG. 6 is a partial elevation view, showing certain components of the apparatus of the present invention visible from other perspectives in FIGS. 1, 4 and 5;

FIG. 7 is an enlarged elevation view of a portion of the apparatus shown in FIG. 6;

FIG. 8 is a further enlarged sectional view, taken generally along the line 8—8 in FIG. 7;

FIG. 10 is an enlarged view of an operator's control station incorporated in the apparatus of FIG. 1;

FIG. 11 is a schematic representation of electrical circuitry and electronic devices incorporated in the apparatus of the present invention and controlling the operation thereof;

FIG. 12 is a perspective view of certain components of the apparatus of FIG. 1 as operated in one cutting mode;

FIGS. 13 through 18 are a series of partially schematic elevation views showing examples of the variety of patterns which can be produced in accordance with the method of the present invention and through the use of the apparatus of FIGS. 1 through 12;

FIG. 19 is a perspective view of a tire carcass and certain components of the apparatus of the present invention as operating in a programming or teaching mode; and FIG. 20 is a view similar to FIGS. 19 and 12 showing a tire carcass and certain components of the apparatus of the present invention as operating in a grooving mode.

DETAILED DESCRIPTION OF THE INVENTION

Figure 9:
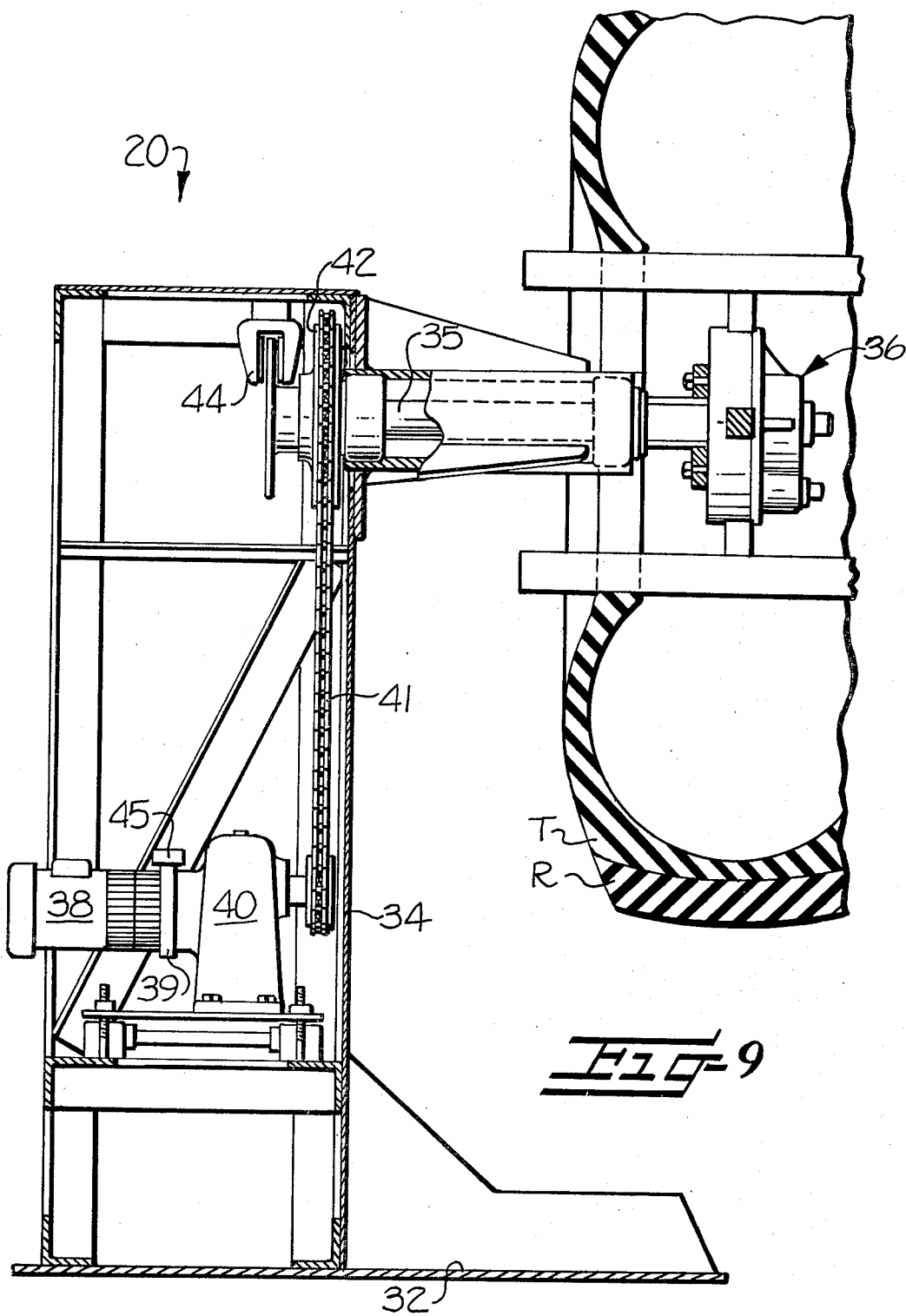
FIG. 9 is an elevation view, partially in section, through a portion of the apparatus of FIG. 1, taken generally along the line 9—9 in that Figure.

While the present invention will be described hereinafter with more particularity, and with particular reference to the accompanying drawings in which a preferred embodiment for the invention is shown, it is to be understood at the outset of the description which follows that the present invention is contemplated as being subject to modification by persons skilled in the applicable arts once an understanding of the present invention has been gained. Accordingly, the detailed description and accompanying drawings are to be understood broadly as directed to teaching persons skilled in the art the general utility of the present invention, and not as limiting the scope of the invention.

Briefly stated, the apparatus of the present invention includes tire mounting means generally indicated at 20 for supporting a tire for rotation about a predetermined axis as described more fully hereinafter. In FIG. 1, where the tire mounting means 20 is shown in perspective, a portion of a tire carcass T, in section, has been shown and the position taken by a tire when supported by the tire mounting means 20 has been indicated in phantom lines. It will be noted that the section through the tire includes not only the previously used tire carcass T but an indication of a body of tread rubber R applied to the tire carcass and in which a lugged tread is to be formed by grooving.

Grooving of the tire is accomplished, as described more fully hereinafter, by means of a heated knife generally indicated at 21. Such a knife may be formed of a suitable metal and heated by passing electrical current therethrough, generally as has been disclosed in previous patents and publications.

In accordance with important features of this invention, means are provided, as generally indicated at 22, for mounting the knife means for movement relative to the tread surface of the tire T and the applied rubber R in which grooves are to be cut. The means mounting the knife means 21 includes a knife block 24, cross shafts 25, 26, a crosshead generally indicated at 28, a stand 29 mounting the crosshead 28 as described more fully hereinafter, and a base 30 mounting the stand 29.

Operation of the apparatus of the present invention is under the control of a control means including an operator station generally indicated at 31 (FIG. 1) and shown in some detail in FIGS. 10 and 11. The control means governs relative movement between the knife means 21 and the rubber R to be cut in a manner described at length hereinafter and so as to form in the rubber R grooves which define a lugged tread on the tread surface of the tire T.

Turning first more specifically to the tire stand 20, that portion of the apparatus of the present invention has a base plate 32 affixed to a shop floor or otherwise secured in such a manner as to be stationary. An upright portion or pylon 34 rises from the base plate to provide a mounting for a generally horizontal shaft 35. The shaft 35 carries an expansible hub generally indicated at 36 (FIGS. 1 and 9) of generally known type which is capable of engaging the beads of a tire T so as to mount the tire concentrically with the axis of the shaft 35 and in an orientation generally similar to the position of the tire when in use. Thus, rotation of the tire about the axis of the shaft 35 moves the tire about its normal rotational axis. With such rotation, the tread surface of the tire passes adjacent the heated knife means 21, for incising or cutting or grooving of the applied layer of rubber R.

In accordance with the present invention, the control means which governs the formation of a lugged tread in a tire T includes driving means for the shaft 35. In the form illustrated, the driving means includes an electrical motor 38 acting through a clutch 39 and a gearing transmission 40 to drive a chain 41 which is trained about a sprocket 42 fixed to the shaft 35. A brake 44 is provided in order to lock the shaft 35 and tire T against rotation during certain steps of grooving in accordance with the present invention. Further, a signalling means 45, preferably in the form of a rotary encoder or a pulse generator, is operatively connected with the motor 38 so as to signal the rotational position of the tire T about the axis of the shaft 35. Such rotational position signalling is important, in the present invention, for controlling a pattern of lugs formed in the tire as described more fully hereinafter.

As briefly pointed out hereinabove, the means for mounting the knife means 21 comprises a knife block 24 (FIGS. 1, and 4 through 6) and cross shaft means 25, 26 engaging the knife block 24 for guiding the knife block along a linear path of travel. The cross shaft means 25, 26 are mounted upon a crosshead means generally indicated at 28. The crosshead means additionally mounts a lead screw 46 and a driving means for rotating the lead screw, preferably in the form of an electrical motor 48. The electrical motor 48 driving the lead screw 46 preferably is of the type known as a stepping motor, in order to facilitate control over knife block movement, and functions as a portion of the control means as described hereinafter. By rotation of the lead screw 46, and engagement thereof with a threaded portion of the knife block 24, the knife block is moved along the guiding cross shafts 25, 26 in a direction generally transversely of the tread face of the tire T.

The crosshead means additionally comprises a generally circular sprocket plate member 49, fixed to the cross shafts 25, 26 and mounted on the stand 29 for rotation about an axis. The axis about which the sprocket plate 49 rotates is defined by a circular array of bearings generally indicated at 50 (FIG. 5) by which the plate and cross shafts are supported. The sprocket member 49 is partially encircled by a driving chain 51 which engages a driving means, preferably in the form of an electrical stepping motor 52. By means of the electrical motor 52, the cross shafts 25, 26 may be moved over a range of varying attitudes with respect to the tire T being renewed.

More particularly, it will be noted that the rotational axis of the crosshead means is perpendicular to the linear path of knife block travel. Thus, the angle of the path along which the heated knife 21 is moved may be varied with respect to the transverse dimension of the tread face of the tire T. In the embodiment illustrated, and as preferred, the axis about which the cross shaft means rotates extends perpendicular to a plane defined by the axis of tire rotation, or the axis of the shaft 35. Specifically, the axis of cross shaft means rotation and the axis of tire rotation intersect and define a common plane. Thus, the knife block may be moved along a linear path parallel to the axis of tire rotation, for cutting essentially straight lug tread designs, or may be skewed relative to that axis in order to produce a variety of lugged tread designs or patterns. As will be noted, skewing of the directions of the linear paths of travel of the knife block and the axis of tire rotation results in causing relative movement between the heated knife means 21 and the tread surface of the tire in a direction circumferentially of the tire.

As a portion of the control means and in association with the means for mounting the heated knife 21 as described hereinabove, a plurality of electrical switches are mounted for sensing and responding to certain movements. More particularly, in order to prevent overrunning of certain limit positions and for other functions as brought out more fully hereinafter, left and right limit switches 54 and 55 are mounted on the knife block means 21 for movement therewith. The limit switches are effective in the control means of the present invention to interrupt energization of the motor means 48 which drives the lead screw 46 where necessary in order to prevent overrunning of a limit position for the knife block. Similarly, appropriate clockwise and counterclockwise limit switches 57, 58 affixed to the sprocket plate member 49 and cooperating with corresponding cams 59, 60 are effective for preventing overrunning of limiting clockwise and counterclockwise rotational positions about the axis of the crosshead.

In order to provide certain control functions as described more fully hereinafter, homing switches are provided for the knife block and the sprocket member 49, and are arranged to signal movement thereof through a centered or "home" position. More particularly, a knife block home switch 61 cooperates with an appropriate cam for signalling movement of the knife block through a position of alignment with the axis of rotation of the sprocket member 49. Similarly, a sprocket member home switch 62 cooperates with an appropriate cam for signalling rotation of the crosshead to a position in which the cross shafts are substantially horizontal and parallel with the axis of tire rotation, as illustrated in FIGS. 1 and 2.

As pointed out briefly hereinabove, the means for mounting the knife means 21 includes a base plate 30. The base plate 30 is fixed to a shop floor or the like, thereby establishing a fixed relationship with respect to the base plate 32 of the means for mounting a tire. The base plate 30 carries a trackway formed by a pair of rails 68, 69 which supports the stand 29 which bears the sprocket member 49 and the crosshead. By means of a lead screw 70 and an appropriate driving means 71, preferably in the form of an electrical stepping motor, for rotating the lead screw 70, the knife 21 may be moved toward or away from the axis of rotation of the tire T. As pointed out more fully hereinafter, the motor 71 controlling the spacing of the knife 21 with respect to the tire axis forms a portion of the control means in accordance with the present invention.

From the description to this point of the apparatus of the present invention, it will be understood that a multiple axis control is provided over the position of the heated knife 21 with respect to any given fixed point on the surface of the tire T, while the tire is maintained stationary. That is, a first axis is defined by the cross shafts 25, 26 which establish a linear path of movement of the knife generally transversely with respect to the body of rubber R to be cut. Second, rotation of the sprocket member 49 changes the attitude of the linear path of knife movement with respect to the body of rubber R on a second axis. Third, the spacing of the path of knife travel may be changed with respect to the axis of rotation of the tire, by moving the knife 21 along a third axis toward or away from the tire axis.

These various axes of control cooperate with control over the rotational position of the tire T being grooved in a particular manner and, as preferred, through the use of a memory means which is programmable for storing data identifying a particular tread design to be reproduced and for accessing such stored data for reproducing a predetermined tread design. Preferably, such a memory is accomplished through the use of a digital electronic central processing unit which, in an operating embodiment of the present invention, is a device of the microprocessor type known generally as an 8080. As is schematically illustrated in FIG. 11, and as will be described more fully hereinafter, such a central processing unit (CPU) cooperates with operator selected manual settings and with scanning means for establishing a substantially fully automatic control over tread formation by grooving or cutting.

Referring now more particularly to FIGS. 1 and 4 through 8, a scanning means generally indicated at 72 is mounted on the knife block means 24 for movement therewith relative to the tread surface of a tire T undergoing renewal. The scanning means 72 is positionable in a scanning position (solid lines in FIG. 4) for passing closely adjacent the tread surface of the tire T. The scanning head 72 is also positionable in an inoperative position (dotted lines in FIG. 4, solid lines in FIGS. 1 and 5) withdrawn from the tread surface. Sensing means are carried by the scanning head 72 and are operative when the head is in the scanning position for tracing a contour on the tread surface. Preferably, the sensing means comprises photoelectric detector means, shown in the form of a pair of photoelectric detectors, for following an optically discernible templet line. The sensing means also comprises roller means for engaging the tread surface and for following the transverse curvature thereof.

More particularly, and as illustrated in FIG. 18, a templet such as a piece of light colored metal or paper 74 may be temporarily fixed to a tread face of the tire T. Where the rubber R applied to the tire T is quire dark, an edge of the templet 74 defines an optically discernible line. Alternatively, such a line may be drawn using black ink or the like on a light colored background. By means of the provision of a pair of photoelectric detectors, the position of the scanning means 72, and thus of the knife 21 and knife block 24, relative to the templet line can be distinguished by appropriate memory circuitry.

At the same time a roller 75 mounted on a spring loaded plunger 76 engages the surface of the tire. By means of appropriate electrical devices, which may be switches or which may be variable resistance elements such as potentiometers, the distance by which the knife block 24 and thus the knife 21 and scanning means 72 are spaced from the axis of rotation of the tire T is detected and signalled.

The cooperation of these apparatus elements may be made more clear by a description of the operation of the apparatus of the present invention, with particular attention to a method of forming a lugged tread on a tire which has had tread rubber previously applied thereto and which is mounted for rotation about its axis.

With a tire so mounted, an operator (manipulating the controls provided on the operator panel 31, FIG. 10) selects for certain characteristics of the desired tread design. More particularly, the operator must set the number of lugs to be provided encircling the tire. Further, the operator must select a shape characteristic of those lugs as being either single cut or double cut. As used here, the term "single cut" means that a lug is defined between a pair of grooves or incisions, each of which extends for the full transverse width of the tread surface of the tire, such as are shown for example in FIGS. 16 through 18. The term "double cut" refers to a trade design in which lugs are defined between sets of grooves, cuts or incisions each of which extends for less than half the transverse width of the tread face of the tire, as shown for example in FIGS. 13 through 15. The operator must also select between opposing or offset cuts. As herein used, the term opposing refers to the knife entering or exiting the shoulder portions adjacent the side edges of the transverse width of the tread surface of a tire undergoing renewal in substantial alignment, widthwise of the tread surface, with another cut. Examples may be seen in FIGS. 13 and 14. The term "offset" refers to such entrance and/or exit locations being out of transverse alignment, as shown for example in FIGS. 15 and 17. The operator must also select a depth of grooving or cutting to be set on a thumb wheel switch and should select a cutting speed.

In accordance with important features of the present invention, should the particular tread design to be reproduced be one which is other than certain predetermined and preprogrammed designs, the operator would then proceed to program the memory of the controller by pressing the control switch labeled "home" and positioning a templet on the tire tread surface (FIG. 19). Upon actuation of the homing function, the knife block 24 is returned to a centered position widthwise of the guide shafts 25, 26, the guide shafts are positioned substantially horizontal and parallel to the axis of tire rotation, and the knife block 24 is withdrawn from the tread surface of the tire. The scanning head 72 is then moved to the scanning position and programming begun. With a templet in place on a tire, an operator may then use the jogging switches for the three axes, in the upper left hand corner of the operator's panel, to position the knife block 24 to the left edge of the tire. In particular, the jogging switches may be set in the "Man". or manual operating position, and the controls manipulated to position the knife block and scanning head in a desired position adjacent the left hand edge of an optically discernible templet line. The operator may then press the "Start scan" switch, actuating the microprocessor to take control over the driving means for the apparatus of the present invention and begin a sequence which stores in the memory of the microprocessor the contour of a groove to be cut.

As used herein, the term "contour" identifies a three dimensional characteristic of a groove or lug. Contour may mean either or both of the transverse shape of a groove as viewed from the position of the knife block 24 or the radial depth profile of a groove as viewed from a perspective generally parallel to the axis of rotation of the tire (as in FIG. 5). As suggested by the views of FIGS. 13 through 18, the shape component of a contour may take a wide variety of straight, curved or combination configurations. Similarly, the profile component of a contour may be substantially constant across the transverse width of the tread face of a tire undergoing renewal or may vary at varying locations across that transverse width.

Typically, the microprocessor operates the driving motors for the components of the apparatus so as to move the knife block 24 and scanning head 72 transversely of the tread face of the tire while tracking one photoelectric detector on a light surface and the other on a dark surface. Additionally, the knife block 24 is brought to such a position that the roller 75 engages the tread surface of the tire and is maintained at a predetermined distance therefrom.

Where the operator has selected a single cut, the knife block 24 and scanning head 72 are permitted to traverse the entire transverse width of the tread face of the tire before the operator presses the "Stop scan" switch. In the event that the operator has selected double cut, normal programming operation would lead the operator to press the stop scan switch prior to movement of the knife block 24 and scanning head means 72 over one-half of the transverse width of the tread surface of the tire. In such double cut operation, the operator would then move the knife block 24, through use of the manually operable switches, to the right side of the tread surface and would substantially repeat the scanning and programming process, moving the knife block 24 and scanning head means 72 in the opposite direction (from right toward left) to store in the memory of the CPU data necessary for the second portion of the double cut. Upon completion of the scanning process, the CPU has been programmed and has stored in a memory data sufficient to fully identify the contour to be produce during cutting. The apparatus has thus been prepared for forming a lugged tread on the tire.

Where necessary or appropriate, side edges of the body of rubber R applied to the carcass of the tire T may be trimmed before grooving begins, as illustrated in FIG. 12. As there shown, the curved or essentially U-shaped knife used for grooving (as shown in FIGS. 1 and 5) may be replaced by an essentially straight knife blade mounted from the knife block 24 and positioned through use of the jogging switches to trim the body of tire is rotated.

Thereupon, the operator may return the jogging switches to the automatic function position, move the scanning head means 72 to the inoperative position, and begin a cutting sequence by actuating the "Start cut" switch. The central processing unit then operates, with the driving means, to access from memory the data necessary for reproduction of contours during grooving.

More particularly, the various drives are operated to move the knife block to the left side of the tire, position the knife 21 for incision or cutting of the rubber R, and make an initial cut transversely of the tread surface. In the event that the lug design to be reproduced involves an angled or compound shape, the crosshead will be rotated to an appropriate attitude before and/or during cutting.

In the event that a single cut was selected, the cutting stroke is completed, and the logic system then rotates the tire to the position of the next cut. Such rotation is through a predetermined rotational angle, determined from the number of lugs to be included in the tread design and is established from the signalling of the rotational position of the tire. The next subsequent cutting pass is then made, either by reversing the direction of drive of the knife block so as to alternate from one side of the tread surface to the other, or by returning the knife to the left side starting position. At the same time, a register of the number of cuts is incremented by one, in order to permit the central processing unit to make a determination as to whether more lugs are to be cut. In the event that the register has not been filled and more cuts are to be made, the central processing unit will return to the cutting sequence unless the operator actuates the "Stop cut" switch. In the event that the operator presses the "Stop cut" button, it will then be necessary that the operator actuates the "Start cut" switch to re-enter the automatically controlled sequence. When the register has been incremented by a number equal to the number set by the operator, the program sequence has been concluded and machine operation will stop.

In the event that a double cut was selected, completion of the first scanned pattern with a cut to a medial portion of the tread surface causes the knife block 24 to moved to the right side of the tire in preparation for a leftward moving cutting of a second portion of the pattern. Where an offset cut was selected, the tire is rotated between a rightward moving cut from the left side of the tread surface and a leftward moving cut from the right side of the surface. Upon completion of two cuts, the tire is rotated, the register of lugs cut is incremented, and the program proceeds as described briefly above.

In an operating embodiment of the present invention, it has been discovered that a wide range of lug contours is reproducible with a three axis control as described above and without necessity of rotating the tire during a cutting stroke. This capability flows from the coordinated and controlled movement of the knife block transversely of the tread surface and circumferentially of the tire, due to controlled movement of the knife block along the path defined by the guiding shafts 25, 26 and coordinated changes in the attitudinal relation of the crosshead to the tire axis. However, it is contemplated that, through the provision of the programmable central processing unit, control over rotation of the tire about its axis may be accomplished at the same time that control over the transverse movement of the knife block, the attitude of the crosshead, and the spacing of the knife relative to the axis of rotation of the tire is also accomplished. With such a fully controlled apparatus and method, great flexibility in accomplishing variation in tread designs is achieved.

The detailed description here given does not include any specific program listing for the central processing unit. Instead, the description of the functional sequence and the cooperation of the control means given above has been deemed a disclosure sufficient to enable a person of ordinary skill in the design and implementation of logic systems to write and install appropriate programs. This form of disclosure has been chosen primarily because the microprocessor technology is currently in an accelerated rate of developement which is contemplated as facilitating achievment of operation as described above. While specific program listings have been developed for an operating embodiment of this invention from the functional sequence described, it is believed that development of microprocessor technology has opened alternative approaches to such programming which will permit persons of ordinary skill to implement the functions described in other ways, once an understanding of the present invention has been attained.

That which is claimed is:

1. In an apparatus for forming a predetermined grooved tread design in tread rubber applied to a tire, said apparatus including tire mounting means for supporting a tire for rotation about a predetermined axis, heated knife means for forming grooves in tread rubber previously applied to the tire, and means mounting said knife means for movement transversely of the tread surface of the tire, the improvement comprising control means including programmable memory means for controlling the movement of said knife means to form grooves transversely of the tread surface of the tire and of any selected one of a plurality of different shapes including straight, curved and combinations thereof and for controlling rotation of said tire mounting means in timed relation to movement of said knife means to produce the desired number of grooves in the tread rubber on the tire to form said predetermined tread design.

2. The apparatus according to claim 1 wherein said control means includes means for sensing the contour of a templet having the desired contour of a groove to be formed in the tread surface of the tire, and said programmable memory means then controlling movement of said knife means to reproduce the contour sensed by said sensing means.

3. The apparatus according to claim 2 wherein said sensing means comprises photoelectric cell means carried by said knife mounting means for sensing a templet positioned on the tread surface of the tire upon initial movement of said knife mounting means transversely of the tread surface of the tire.

4. In an apparatus for forming a lugged tread design in tread rubber applied to a tire and including tire mounting means for supporting a tire for rotation about a predetermined axis, heated knife means for forming grooves in tread rubber previously applied to the tire, means mounting said knife means for movement transversely of the tread surface of the tire, and means for driving the tire in rotation about said axis and for driving said knife means in movement transversely of said tread surface; the improvement comprising control means including programmable memory means and operatively connected with said driving means for coordinating movement of said knife means transversely of the tread surface of the tire with rotation of said tire mounting means in timed relation to movement of said knife means so as to reproduce a number of grooves of one of a variety of curved or compound contours and thereby form said tread design.

5. Apparatus according to claim 4 wherein said driving means comprises first motor means for moving said knife means, and second motor means for rotating the tire; and further wherein said control means comprises position signalling means operatively connected with said second motor means for signalling the rotational position of the tire, said memory means being operatively connected with said motor means and said signalling means and programmable for sequentially actuating said first motor means for cutting a groove and then actuating said second motor means for rotating the tire so as to reproduce a programmed number of grooves.

6. In an apparatus for forming a grooved tread design in tread rubber applied to a tire and including tire mounting means for supporting a tire for rotation about a predetermined axis, heated knife means for forming grooves in tread rubber previously applied to the tire, first mounting means mounting said knife means for movement along a path of travel extending generally transversely of the tread surface of the tire, and second mounting means mounting said first mounting means for changing the attitude of said path of travel with respect to the axis of rotation of the tire, the improvement comprising control means including programmable memory means and being operative for moving said knife means along said path of travel and for changing the attitude of said path of travel with respect to said axis of rotation in timed relation and in accordance with a predetermined pattern to form grooves in the tread rubber of the tire in one of a variety of curved or compound contours.

7. Apparatus according to claim 6 including means mounting said knife means for movement along a second path of travel toward and away from said axis of rotation of the tire, and wherein said control means also moves said knife means along said second path of travel to control the depth of the grooves being formed in the tread rubber.

8. Apparatus according to claim 6 wherein said control means includes sensing means for sensing a desired contour for the grooves to be formed, and wherein said control means moves said knife means along said second path of travel responsive to the contour sensed by said sensing means to form grooves whose depth corresponds to said contour.

9. Apparatus according to claim 8 wherein said sensing means senses the transverse curvature of the tread surface of the tire and said grooves are formed with uniform depth throughout the transverse extent of the tread surface.

10. Apparatus according to claim 8 wherein said sensing means senses a templet applied to the tread surface in position to be sensed by said sensing means and said grooves are formed with variable depth across the transverse extent of the tread surface.

11. In an apparatus for forming a lugged tread design in tread rubber applied to a tire and including tire mounting means for supporting a tire for rotation about a predetermined axis, heated knife means for forming grooves in tread rubber previously applied to the tire, first mounting means mounting said knife means for movement along a path of travel extending generally transversely of the tread surface of the tire, second mounting means mounting said first mounting means for changing the attitude of said path of travel with respect to the axis of rotation of the tire, and means for driving said knife means in movement transversely of said tread surface and for driving said second mounting means in changes in attitude; the improvement comprising control means including programmable memory means and operatively connected with said driving means for coordinating movement of said knife means along said path of travel and changes in the attitude of said path of travel with respect to said axis of rotation in timed relation and in accordance with a predetermined pattern to form grooves in the tread rubber of the tire in one of a variety of curved or compound contours.

12. Apparatus according to claim 11 wherein said means mounting said knife means comprises a knife block, cross shaft means engaging said knife block for guiding said knife block along a linear path of travel, and crosshead means mounting said cross shaft means for rotation about an axis perpendicular to said linear path of knife block travel, said cross shaft means and said crosshead means cooperating for accommodating changes in the attitude of said linear path of knife block travel relative to said tire.

13. Apparatus according to claim 12 wherein said axis of cross shaft means rotation extends perpendicular to a plane defined by said axis of tire rotation.

14. Apparatus according to claim 12 wherein said axes intersect.

15. Apparatus according to claim 12 wherein said means for driving comprises first motor means for moving said knife block along said path of travel, and second motor means for rotating said crosshead means about said axis; and further wherein said control means comprises a plurality of switch means mounted for sensing and responding to movement of said knife block to limit position to the sides of the tread surface of the tire and to movement of said crosshead means to limit positions clockwise and counterclockwise about said axis, said switch means being operatively connected with said motor means for preventing overrunning of the limit positions.

16. Apparatus according to claim 11 wherein said means mounting said knife means comprises a knife block, and cross shaft means engaging said knife block for guiding said knife block along a linear path of travel; and further wherein said control means comprises scanning head means mounted on said knife block for movement therewith along said path of travel and being positionable in a scanning position for passing closely adjacent said tread surface of the tire and in an inoperative position withdrawn from said tread surface, sensing means carried by said scanning head means and operative when said scanning head is in said scanning position for tracing a contour on said tread surface, and further wherein said memory means is operatively connected to said sensing means and programmable in response to tracing of a contour for storing data identifying said contour and thereafter for accessing stored data for reproduction of said contours during tread rubber grooving.

17. Apparatus according to claim 16 wherein said sensing means includes photoelectric detector means for following an optically discernible templet line extending transversely of said tread surface.

18. Apparatus according to one of claims 16 or 17 wherein said sensing means includes roller means for engaging said tread surface and for following the transverse curvature thereof.

19. Apparatus according to claim 17 wherein said sensing means comprises a pair of photoelectric detectors for differentiating and following an optically discernible templet line extending transversely of said tread surface.

20. In an apparatus for forming a grooved tread design in tread rubber applied to a tire and including tire mounting means for supporting a tire for rotation about a predetermined axis, heated knife means for forming grooves in tread rubber previously applied to the tire, first mounting means mounting said knife means for movement along a path of travel extending generally transversely of the tread surface of the tire, and second mounting means mounting said first mounting means for changing the spacing of said path of travel from the axis of rotation of the tire, the improvement comprising control means including programmable memory means and operative for moving said knife means along said path of travel and for changing the spacing of said path of travel with respect to said axis of rotation in timed relation and in accordance with a predetermined pattern to form grooves in the tread rubber of the tire in one of a variety of uniform or varying depth contours.

21. In an apparatus for forming a grooved tread design in tread rubber applied to a tire, said apparatus including tire mounting means for supporting a tire for rotation about a predetermined axis, heated knife means for forming grooves in tread rubber previously applied to the tire, and means mounting said knife means for movement along a first path of travel generally transversely of the tread surface of the tire and along a second path of travel perpendicular to said axis of rotation of the tire, the improvement comprising control means including programmable memory means and operative for controlling movement of said knife means and rotation of said tire mounting means in timed relation to each other and in accordance with a predetermined pattern, said control means including means for sensing the transverse curvature of the tread surface of the tire, and said control means controlling movement of said knife means along said second path of travel in response to the transverse curvature sensed by said sensing means to form grooves of a uniform depth in the tread surface of the tire.

22. Apparatus according to claim 21 wherein said sensing means is carried by said knife mounting means for movement with said knife means.

23. Apparatus according to claim 21 wherein said sensing means senses the transverse curvature of the tread surface of the tire during the initial movement of said knive means across the tread surface.

24. Apparatus according to claim 21 wherein said memory means is connected to said sensing means and responsive thereto for storing the transverse curvature sensed by said sensing means and for thereafter controlling said knife means in accordance therewith during formation of the desired number of grooves in that tire.

25. In an apparatus for forming a lugged tread design in tread rubber applied to a tire and including tire mounting means for supporting a tire for rotation about a predetermined axis, heated knife means for forming grooves in tread rubber previously applied to the tire, first mounting means mounting said knife means for movement along a path of travel extending generally transversely of the tread surface of the tire, second mounting means mounting said first mounting means for changing the spacing of said path of travel from the axis of rotation of the tire, and means for driving said knife means in movement transversely of said tread surface and for driving said second mounting means in changes in spacing; the improvement comprising control means including programmable memory means and operatively connected with said driving means for coordinating movement of said knife means along said path of travel and changes in the spacing of said path of travel with respect to said axis of rotation in timed relation and in accordance with a predetermined pattern to form grooves in the tread rubber of the tire in one of a variety of uniform or varying depth contours.

26. In an apparatus for forming a lugged tread design in tread rubber applied to a tire, said apparatus including tire mounting means for supporting a tire for rotation about a predetermined axis, heated knife means for forming grooves in tread rubber previously applied to the tire, first mounting means mounting said knife means for movement along a path of travel extending generally transversely of the tread surface of the tire, second mounting means mounting said first mounting means for changing the attitude of said path of travel with respect to the axis of rotation of the tire, third mounting means mounting said second mounting means for changing the spacing of said path of travel from the axis of rotation of the tire, first motor means for driving said knife means in movement transversely of said tread surface, second motor means for driving said second mounting means in changes in attitude, and third motor means for driving said third mounting means in changes in spacing; the improvement comprising control means including programmable memory means and operatively connected with said driving means for coordinating (a) movement of said knife means along said path of travel and (b) changes in the attitude of said path of travel with respect to said axis of rotation and (c) changes in the spacing of said path of travel with respect to said axis of rotation in timed relation and in accordance with a predetermined pattern to form grooves in the tread rubber of the tire in one of a variety of curved or compond contours.

27. Apparatus according to claim 26 wherein the apparatus further includes fourth motor means for rotating the tire; and further wherein said control means comprises position signalling means operatively connected with said fourth motor means for signalling the rotational position of the tire, said memory means being operatively connected with said motor means and said signalling means and programmable for sequentially actuating at least certain ones of said first, second and third motor means for cutting a groove and then actuating said fourth motor means for rotating the tire so as to reproduce a number of grooves of the one of a variety of curved or compound contours and thereby form said tread design.

28. Apparatus according to claim 26 wherein said first mounting means comprises a knife block, and said second mounting means comprises cross shaft means engaging said knife block for guiding said knife block along a straight line path of travel; and further wherein said control means comprises scanning head means mounted on said knife block for movement therewith along said path of travel and being positionable in a scanning position for passing closely adjacent said tread surface of the tire and in an inoperative position withdrawn from said tread surface, sensing means carried by said scanning head means and operative when said scanning head is in said scanning position for tracing a contour on said tread surface, said memory means being operatively connected to said sensing means and programmable in response to tracing of a contour for storing data identifying said contour and thereafter for accessing stored data for reproduction of said contours during tread rubber grooving.

29. Apparatus according to claim 28 wherein said sensing means comprises photoelectric detector means for following an optically discernible templet line extending transversely of said tread surface.

30. Apparatus according to one of claims 28 or 29 wherein said sensing means comprises roller means for engaging said tread surface and for following the transverse curvature thereof.

31. Apparatus according to claim 26 wherein said first mounting means comprises a knife block, and said second mounting means comprises cross shaft means engaging said knife block for guiding said knife block along a straight line path of travel, and crosshead means mounting said cross shaft means for rotation about an axis perpendicular to said path of knife block travel and perpendicular to a plane defined by said axis of tire rotation.

32. Apparatus according to claim 31 wherein said axes intersect.

33. In a method of forming a grooved tread design in a tire which has had tread rubber applied thereto and which is mounted for rotation about its axis, an improvement comprising forming grooves in the tread rubber on the tire by moving a heated knife transversely of the tread surface of the tire while causing relative movement between the heated knife and the tread surface of the tire in a direction circumferentially of the tire in accordance with a pattern stored in a programmable memory and while indexing the tire predetermined equal amounts between successive transverse movements of the heated knife so as to produce a predetermined number of grooves having one of a variety of different contours and thereby form said grooved tread design.

34. In a method of forming a grooved tread design in a tire which had had tread rubber applied thereto and which is mounted for rotation about its axis, an improvement comprising forming a plurality of grooves in the tread rubber on the tire by moving a heated knife transversely of the tread surface of the tire, and intermittently indexing the tire by predetermined rotational distances in accordance with a pattern stored in a programmable memory and in response to completion of a groove so as to produce a predetermined number of grooves spaced circumferentially about the tire and having one of a variety of curved or compound contours and thereby form said grooved tread design.

35. A method according to claim 34 wherein the step of forming grooves comprises moving a heated knife in a first direction from one side edge portion of the tread surface to a transverse medial portion of the tread surface, then withdrawing the knife so as to produce a groove extending only partially across the transverse width of the tread surface, then moving the heated knife in a direction opposite the first direction from the other side edge portion of the tread surface to a medial portion of the tread surface, and then withdrawing the knife so as to produce a groove extending only partially across the transverse width of the tread surface.

36. A method according to claim 35 further comprising indexing the tire predetermined equal amounts between successive transverse movements of the heated knife.

37. A method according to claim 35 further comprising indexing the tire predetermined equal amounts between successive sets of oppositely directed transverse movements of the heated knife.

38. In a method of forming a lugged tread on a tire which has had tread rubber applied thereto and which is mounted for rotation about its axis, an improvement comprising forming a groove in the tread rubber on the tire by moving a heated knife transversely of the tread surface of the tire while guiding the heated knife along a predetermined path in accordance with a pattern stored in a programmable memory so as to form a groove of predetermined contour, indexing the tire by rotating the tire through a predetermined rotational angle in response to completion of formation of the groove, forming another groove in the tread rubber on the tire by moving the heated knife transversely of the tread surface in response to the indexing of the tire while guiding the heated knife along the predetermined path, and then repeating automatically and successively steps of indexing and forming grooves until a predetermined lugged tread pattern has been produced in the tread surface of the tire.

39. A method according to claim 38 wherein the step of guiding the heated knife comprises moving the heated knife along a predetermined straight line path while controllably changing the attitude of that path relative to the axis of tire rotation so as to produce a predetermined lug shape.

40. A method according to claim 39 wherein the step of controllably changing the attitude of the straight line path comprises skewing the straight line path relative to the axis of tire rotation and controllably changing the skew relationship during movement of the heated knife transversely of the tread surface.

41. A method according to one of claims 38 or 39 wherein the step of guiding the knife comprises controllably changing the spacing of the heated knife from the axis of tire rotation during movement of the knife transversely of the tread surface so as to produce a predetermined lug profile.

42. A method according to claim 38 wherein the step of forming a groove is preceded by the step of trimming side edge portions of the tread rubber on the tire by positioning a knife blade to extend adjacent a side edge portion of the tread rubber while rotating the tire.

43. In an apparatus for forming a predetermined grooved tread design in tread rubber applied to a tire, said apparatus including tire mounting means for supporting a tire for rotation about a predetermined axis, heated knife means for forming grooves in tread rubber previously applied to the tire, and means mounting said knife means for movement transversely of the tread surface of the tire, the improvement comprising control means for controlling the movement of said knife means to form grooves transversely of the tread surface of the tire and including programmable memory means for directing movement of said knife means along any selected one of a plurality of different paths to form a corresponding selected one of a plurality of groove shapes including straight, curved and combinations thereof, and for controlling rotation of said tire mounting means in timed relation to movement of said knife means to produce the desired number of grooves in the tread rubber on the tire to form said predetermined tread design.

44. In an apparatus for forming a grooved tread design in tread rubber applied to a tire and including tire mounting means for supporting a tire for rotation about a predetermined axis, heated knife means for forming grooves in tread rubber previously applied to the tire, first mounting means mounting said knife means for movement along a path of travel extending in a predetermined direction relative to the tread surface of the tire, and second mounting means mounting said first mounting means for changing the attitude of said path of travel with respect to the axis of rotation of the tire, the improvement comprising control means including programmable memory means and being operative for moving said knife means along said path of travel and for changing the attitude of said path of travel with respect to said axis of rotation in accordance with a pattern stored in said memory means to form grooves in the tread rubber of the tire in one of a variety of curved or compound contours.

* * * * *

UNITED STATES PATENT AND TRADEMARK OFFICE
CERTIFICATE OF CORRECTION

PATENT NO. : 4,237,955
DATED : December 9, 1980
INVENTOR(S) : Andrew R. Clayton

It is certified that error appears in the above-identified patent and that said Letters Patent are hereby corrected as shown below:

```
Column 1, line 21, "Ragen" should be --Ragan--
Column 1, line 20, before "27,006" insert --Reissue--
Column 1, line 22, before "27,006" insert --Reissue--
Column 1, line 33, before "27,006" insert --Reissue--
Column 1, line 39, before "27,006" insert --Reissue--
Column 7, line 60, "trade" should be --tread--
Column 8, line 26, "Man". should be --"Man."--
Column 9, line 11, "duce" should be --duced--
Column 9, line 21, before "tire" insert --rubber R to a
desired shoulder or side edge configuration as the--
Column 9, line 64, after "to" insert --be--
Column 15, line 62, "had" (first occurrence) should be
--has--.
```

Signed and Sealed this

Twenty-ninth Day of September 1981

[SEAL]

Attest:

Attesting Officer

GERALD J. MOSSINGHOFF

Commissioner of Patents and Trademarks